MARY F. POTTS.

Improvement in Sad-Irons.

No. 5,102. Reissued Oct. 15, 1872.

Witness:

Henry N. Miller

C. L. Evert.

Inventor.

Mary F. Potts.

per Alexander Macomber

Attorneys.

A.M. PHOTO-LITHOGRAPHIC CO. N.Y. (OSBORNE'S PROCESS.)

UNITED STATES PATENT OFFICE.

MARY FLORENCE POTTS, OF OTTUMWA, IOWA, ASSIGNOR OF ONE-HALF INTEREST TO ISAAC P. CHALFANT.

IMPROVEMENT IN SAD-IRONS.

Specification forming part of Letters Patent No. 113,448, dated April 4, 1871; reissue No. 5,102, dated October 15, 1872.

*To all whom it may concern:*

Be it known that I, MARY FLORENCE POTTS, of Ottumwa, in the county of Wapello and in the State of Iowa, have invented certain new and useful Improvements in Sad-Irons; and do hereby declare that the following is a full, clear, and exact description thereof, reference being had to the accompanying drawing and to the letters of reference marked thereon making a part of this specification.

The nature of my invention consists in the construction and arrangement of a "sad-iron," as will be hereinafter more fully set forth.

In order to enable others skilled in the art to which my invention appertains to make and use the same, I will now proceed to describe its construction and operation, referring to the annexed drawing, in which—

Figure 1:
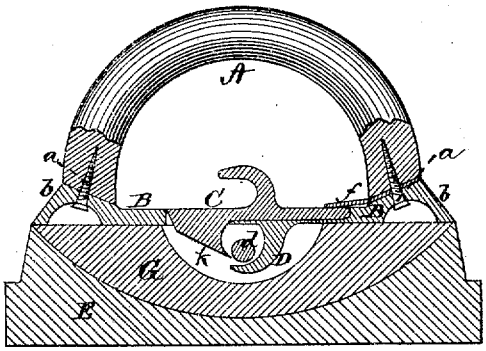
Figure 2:
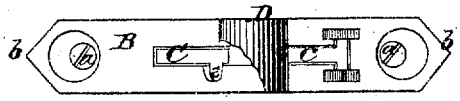
Figure 3:
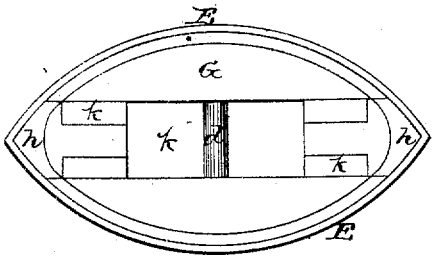

Figure 1 is a longitudinal vertical section of my sad-iron with the handle in place; Fig. 2 is a bottom view of the plate to which the handle is attached; and Fig. 3 is a plan view of the sad-iron with the handle removed.

A represents the handle, which is made in curved or rather semicircular shape. The straight or horizontal handle ordinarily used on sad-irons cannot be clasped in a natural and easy manner, and produces pain of the arm and wrist. The peculiar shape of my handle A makes it fit the hand, no matter what part of the handle is clasped by the hand, and enables the operator to always keep the wrist and arm in line and straight with the lower part of the arm and push the sad-iron as a person pushes a plane. A handle of this form —that is, semicircular—may be used on any sad-iron or tailor's goose. B is a metal plate attached to the bottom of the handle A by two screws, *a a*, the ends of said plate having raised beveled surfaces *b b* for the ends of the handle to rest upon, and forming, from underneath, countersinks for the heads of the screws *a a*. By this means I am also enabled to put the screws *a a* through the cross-grained part of the wooden handle A making it very strong. The plate B is provided with a slot running longitudinally through a part of it, in which slot is pivoted, and moves up and down, the latch C. On its under side is also attached a lip or tongue piece, D. The latch C is pivoted at one end and moves up and down in the slot in the metal plate B, and closes over or onto the cross piece or bar *d* cast to the inner sides of the sad-iron, preventing the lip D from slipping from under the bar *d* and allowing the iron to fall. One or more of these cross pieces or bars, *d*, may be used, and also one or more lips, D, can be used on one iron. Upon the lower end of the latch C is a projection, *e*, as shown in Fig. 2, which prevents the latch from being raised far enough to break the spring *f*. This spring *f* is fastened between the end of the handle and the metal plate by the screw *a*, and serves to prevent the latch C from falling out when the sad-iron is turned upside down, and retains it firmly in place. This device for attaching a handle may be used with any sad-iron or other similar instrument, whether solid or otherwise.

In a former patent (No. 103,501) granted to me for sad-iron, I fully described my mode of making the same with a metal shell or metal sides and the inside filled with some suitable material, non-conductor of heat. In that case I rounded up the metal into the center of the cavity lengthwise; but in this case I hollow out from the middle and increase the thickness of metal at the ends, where most heat is needed.

E is the solid or iron part of the sad-iron, and G the non-conductor. At each end of the sad-iron is formed a recess, *h*, for the ends of the metal plate B to fit down into and prevent all side motion of the handle A, the said ends of the metal plate being drawn down tight into the recesses *h h*, and resting on the ends of the iron by the action of the lip or tongue piece D passing under the cross-piece *d* making the handle firm and secure onto the sad-iron, and yet easily taken off and put on. In the non-conducting material G which fills the cavity in the sad-iron E are formed cavities *k k* to allow the tongue or lip D to pass under the cross-piece *d*.

Having thus fully described my invention, what I claim as new, and desire to secure by Letters Patent, is—

1. In combination with a sad-iron the cylindrical semicircular wood handle A with its ends secured to a latching mechanism on the top of the sad-iron, substantially as set forth.

2. The sad-iron base E made of metal hollowed out in the center, with the end or ends made solid and the cavity filled with non-conducting material, as shown and described.

3. The combination of the plate B provided with raised beveled end pieces *b b*, the latch C, and lip or tongue D, all constructed and arranged substantially as and for the purposes herein set forth.

4. The combination of the semicircular handle A, plate B, latch C, tongue D, cross-bar *d*, and spring *f*, all constructed and arranged substantially as and for the purposes herein set forth.

5. The combination of the handle A, plate B, latch C, tongue D, iron E, and non-conducting filling G, all constructed and arranged substantially as and for the purposes herein set forth.

In testimony that I claim the foregoing I have hereunto set my hand this 19th day of August, 1872.

MARY F. POTTS.

Witnesses:
R. W. BOYD,
GEO. W. CHAMBERLIN.